(12) United States Patent
Ouzounidis et al.

(10) Patent No.: US 7,130,918 B2
(45) Date of Patent: Oct. 31, 2006

(54) MOBILE INTERNET VOICE SERVICE

(75) Inventors: Jan Michael Ouzounidis, Nacka (SE); Christopher Donald Williams, Stockholm (SE); Christer Lundin, Sollentuna (SE)

(73) Assignee: Microsoft Corporation, Redmond, WA (US)

( * ) Notice: Subject to any disclaimer, the term of this patent is extended or adjusted under 35 U.S.C. 154(b) by 626 days.

(21) Appl. No.: 09/827,105

(22) Filed: Apr. 5, 2001

(65) Prior Publication Data

US 2002/0007397 A1 Jan. 17, 2002

(30) Foreign Application Priority Data

Apr. 27, 2000 (SE) .................................... 0001536

(51) Int. Cl.
*G06F 15/173* (2006.01)
*H04Q 7/20* (2006.01)

(52) U.S. Cl. ...................... 709/238; 709/244; 709/239; 709/240; 455/433; 455/432.2

(58) Field of Classification Search ................ 709/238, 709/244, 239, 240, 206, 207; 370/392; 455/433, 455/432.2
See application file for complete search history.

(56) References Cited

U.S. PATENT DOCUMENTS

| 5,742,905 A | | 4/1998 | Pepe et al. |
| 5,761,201 A | | 6/1998 | Vaudreuil |
| 5,901,359 A | * | 5/1999 | Malmstrom .................. 455/461 |
| 5,915,222 A | * | 6/1999 | Olsson et al. ................ 455/466 |
| 5,928,325 A | * | 7/1999 | Shaughnessy et al. ...... 709/206 |
| 6,018,657 A | * | 1/2000 | Kennedy et al. .......... 455/426.1 |
| 6,216,104 B1 | * | 4/2001 | Moshfeghi et al. ......... 704/260 |
| 6,654,789 B1 | * | 11/2003 | Bliss et al. .................. 709/206 |

FOREIGN PATENT DOCUMENTS

| EP | 0 924 918 A2 | 6/1999 |
| WO | WO 99/65256 | 12/1999 |
| WO | WO 00/48099 | 8/2000 |

OTHER PUBLICATIONS

M.R. Croak, *Unified Messaging Will Deliver The Message*, AT&T Technology, American Telephone & Telegraph Co., Short Hills, New Jersey, vol. 4, No. 2, 1989, pp. 2-5.

(Continued)

*Primary Examiner*—Thomas Pham
(74) *Attorney, Agent, or Firm*—Workman Nydegger (57) ABSTRACT

A method and a corresponding system for enabling the sending of messages to a recipient via any of a number of messaging systems of different types are disclosed. In the method addresses for said recipient are stored. Furthermore, recipient availability information is received from the messaging systems. The recipient availability information is interpreted so as to determine in which of the messaging systems the recipient is currently available. Furthermore, an originator input including an identification of the recipient is received and an address among the stored addresses that are associated with messaging systems in which the recipient is currently available is chosen. Finally, the messaging system associated with the chosen address is identified.

27 Claims, 5 Drawing Sheets

OTHER PUBLICATIONS

Martin F. Parker et al., *Unified Messaging-A Value-Creating Engine for Next-Generation Network Services*, Bell Labs Technical Journal, vol. 4, No. 2, pp. 71-87, Apr.-Jun. 1999.

Suhayya Abu-Hakima et al., *A Common Multi-Agen Testbed for Diverse Seamless Personal Information Networking Application*, IEEE Communications Magazine, vol. 36, No. 7, pp. 68-74, Jul. 1998.

John F. Meech et al., *Intelligent Seamless Messaging*, Proceedings of the IEEE International Conference on Systems, Man and Cybernetics, vol. 2, pp. 1241-1244, 1998.

Ramiro Liscano et al., *Integrating Multi-Modal Messages Across Heterogenous*, Proceedings of the 1997 1st IEEE Enterprise Networking Mini-Conference, Montreal, Que., Canada, pp. 45-53, Jun. 11-12, 1997.

* cited by examiner

MOBILE INTERNET VOICE SERVICE

BACKGROUND OF THE INVENTION

1. The Field of the Invention

The invention generally relates to messaging systems. More specifically the invention relates to a method and a corresponding system for enabling the sending of messages to a recipient via any of a number of messaging systems of different types.

2. The Relevant Technology

In today's communication environment there are a number of different systems for communicating messages between users, such as the Internet, mobile systems and the Public Switched Telephone Network (PSTN). These communication systems have different addressing principles, types of messages (e.g., text or voice) etc. Furthermore one single person usually has one or more addresses in each of these communication systems, such as one e-mail address, one mobile phone number, one fixed phone number etc.

The fact that each person is reachable in a number of different communication networks and that different addresses and message types are used in these messaging systems gives rise to a number of problems. One of the problems is that it is hard for an originator to keep track of all the addresses of a recipient. Another problem is that the originator needs to try some or even all of the different addresses before one address is found at which a recipient is currently reachable. Furthermore, the originator needs to use different interfaces to reach the different addresses, e.g., to send a Short Message System (SMS) message to a recipient the originator needs to connect to a SMS center (SMS-C) and to send an e-mail the originator needs to connect to an e-mail system.

Furthermore, even if a recipient is currently reachable on one of the addresses, such as an e-mail address, it might be the case that the originator has no possibility to send an e-mail at the time. For example, the originator might just have access to a Plain Old Telephone (POTS) Service telephone or a mobile phone at the time. A similar problem arises when the originator only has access to a POTS telephone and the recipient is only available on a mobile phone, but only via SMS messages since the recipient is in a meeting and cannot accept voice communication.

The problems are especially acute when the originator is away from his or her office or home, such as when traveling. In this case the originator could carry a portable computer and some kind of mobile device in order to alleviate the problems above to some extent. Still, the originator needs to perform a number of steps in order to find an address on which the recipient is currently available, such as connecting to an e-mail system and typing a message, connecting to a mobile network and typing an SMS message or placing a call etc. As described the message needs to be repeated for each try. Furthermore, the environment the originator is currently in might not be suitable for typing messages. For example, this is the case when the originator is currently driving a car, walking etc.

SUMMARY OF THE INVENTION

The invention provides a way to enable the sending of messages to a recipient via any of a number of messaging systems of different types, such as an e-mail system, an SMS systems etc.

According to one aspect of the invention, a method is provided. In the method addresses for the recipient are stored, an originator input including an identification of the recipient is received and an address among the stored addresses is chosen, and the messaging system associated with the chosen address is identified.

According to another aspect of the invention a system is provided. The system comprises first interface means connected to the messaging systems and second interface means for receiving an originator input including an identification of the recipient. The system further comprises memory means for storing addresses for said recipient, and first processing means for choosing an address of the stored addresses and for identifying the messaging system associated to the chosen address.

By storing addresses of the recipient and identifying the message systems associated to the addresses, the invention facilitates an originator to send a message to a recipient via any of the message systems without having to remember the different addresses of the recipient or decide in advance which message system to use. In other words the invention provides a unified way for an originator to address a recipient in all the message systems associated with the stored addresses. Furthermore, the invention provides a common interface for sending messages to a recipient via different messaging systems by means of a common interface to the different messaging systems.

The first interface means of a system according to the invention is advantageously provided with the ability to send messages to said recipient via the messaging system associated with the chosen address. In this way, when an originator input is received that further to the recipient identification also includes a message. This message is to be sent to the chosen address via the first interface means. This feature provides the originator with a common interface to send messages, such as SMS or e-mail messages, to a recipient in any of the different messaging systems.

The system according to the invention is further advantageously provided with means for receiving the originator input as a voice input and means for converting the voice input to text. One of the advantages of this feature is that it provides a common and simple interface for the originator to access the system according to the invention. Thus, the originator can use any communication means providing a voice interface, such as a mobile telephone or a POTS telephone, when connecting to the system according to the invention. Together with the feature above that provides a common interface to send messages to a recipient in any of different messaging systems, this feature enables the originator to use, for example, a mobile telephone or even a POTS telephone to send SMS or e-mail messages to the recipient. This can be done without having to type the message.

Further according to the invention, availability information from said messaging systems could be received. This recipient availability information is interpreted so as to determine in which of said messaging systems said recipient is currently available. In other words the system according to the invention can keep track of in which of the messaging systems the recipient may currently be reached. The address to be chosen can then be chosen among the addresses associated with the messaging systems in which the recipient is currently available. This has the further advantage that when an originator sends a message to a recipient, the message will be sent via a message system in which the recipient is currently available.

The availability information could, if the messaging system is a mobile telephone system, be information from an Home Location Register (HLR) or a Visitor Location Register (VLR) indicating whether the recipient is attached to the mobile telephony system, or information from a SMS-C indicating whether a test SMS message has been successfully delivered. The HLR, VLR and SMS-C relate to a GSM system. Of course a similar feature could be provided in a mobile telephone system of some other type, using information from devices corresponding to the HLR, VLR and SMS-C in these other systems.

Another advantageous feature of the invention is that the recipient can store a preferred address for communication. The address that will be chosen can then be the preferred address. For example, the recipient can change the preferred address to indicate the currently preferred address. This can be seen as an alternative way of sending availability information.

BRIEF DESCRIPTION OF THE DRAWINGS

The invention will now be further elucidated by way of exemplary embodiments described hereinafter with reference to the accompanying drawings in which similar reference numbers denote similar features, and in which.

DETAILED DESCRIPTION OF THE PREFERRED EMBODIMENTS

Figure 1:
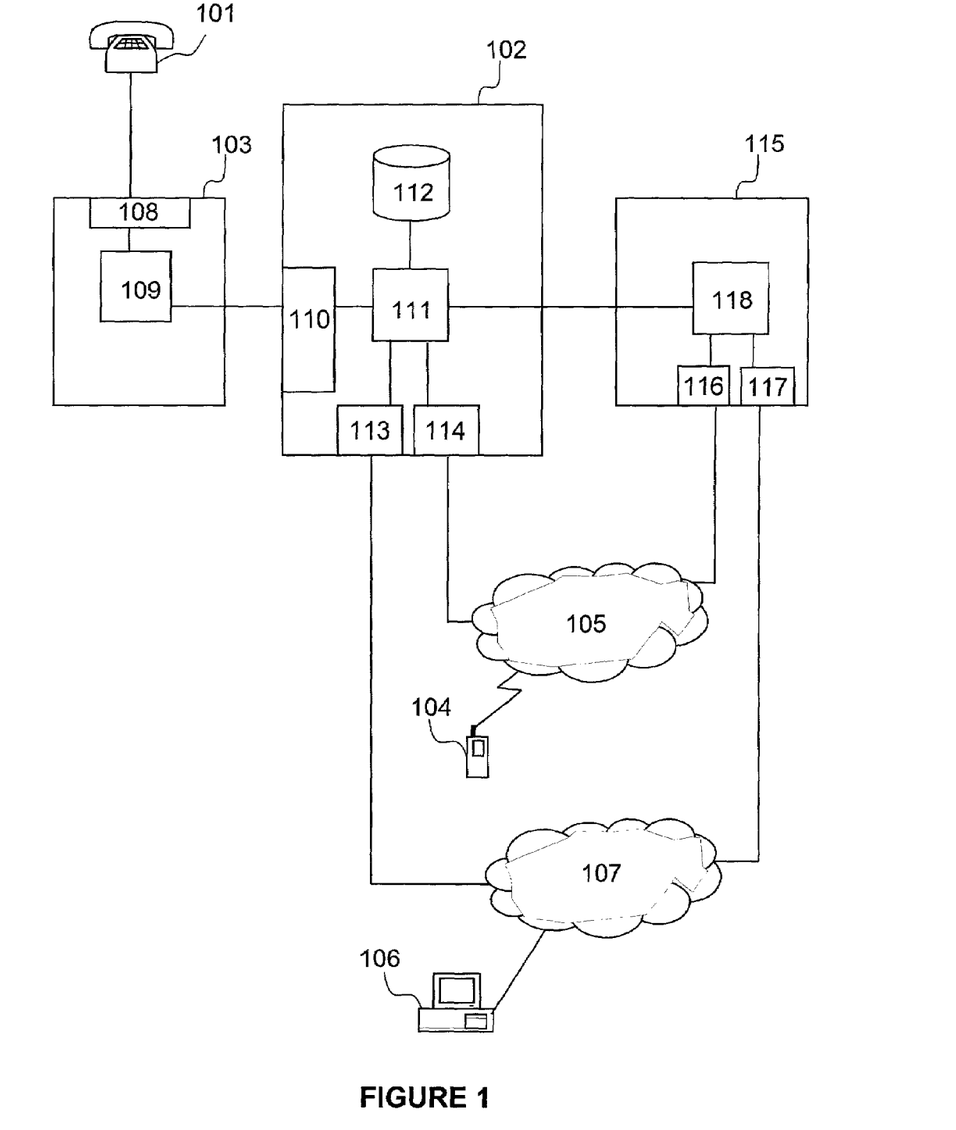
FIG. 1 is a schematic diagram of system in which a system according to the invention is embodied.

In a system in which a system according to the invention is embodied, as shown in FIG. 1, an originator can connect from a terminal 101 to a message server 102 via a voice system 103. This then enables the originator to send messages to a recipient terminal, such as a mobile terminal 104 connected to a mobile network 105 or a computer terminal 106 connected to a computer network 107, e.g., the Internet. The voice system 103 includes fourth interface means 108, which can interpret a voice input from the originator. The fourth interface means 108 are connected to converting means 109 for voice-to-text and text-to-voice conversion. The converter means 109 convert the voice input from the originator to text in order to create a text input that is readable to the message server 102.

The message server 102 includes second interface 110 connected to the voice system 103, which second interface means 110 can receive the text input. The second interface means 110 are also connected to first processing means 111, such as a computer, which interprets and processes the text input. The message server 102 also includes storage means 112, such as a database, for storing recipient information, such as recipient addresses and preferences, and first interface means 113, 114 for connecting the message server 102 to the message systems 105, 106.

Furthermore, the message server 102 is connected to a presence server 115. The presence server 115 includes third interface means 116, 117 for connecting the presence server to the message systems 105, 107. The third interface means 116, 117 receive information from the message systems 105, 107, which information indicates the availability of a recipient terminal 104, 106. The third interface means 116, 117 are then connected to second processing means 118, such as a computer, which interprets the availability information in order to determine whether the recipient terminal 104, 106 is available or not. The result from the second processing means 118 is then sent to the first processing means 111 in the message server 102. The result from the second processing means 118 is then sent to the first processing means 111 in the message server 102.

Figure 2:
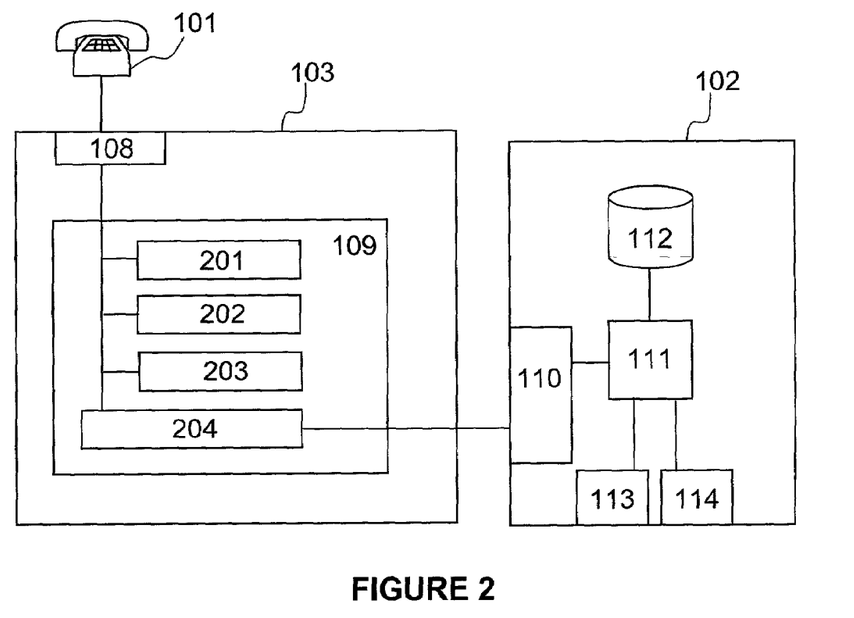
FIG. 2 is a more detailed diagram of a part of the system in FIG. 1.

Referring now to FIG. 2, the originator can connect to the voice system 103 using a voice based communication terminal, such as a POTS telephone, mobile telephone etc., as the originator terminal 101. The connection is done via the fourth interface means 108. The voice system 103 is based on a system including voice recognition means 201 and conversion means 202 for conversion from voice-to-text and vice versa. The voice system 103 is connected to a voice based communication system. This type of voice system also includes a dialog server 203 for guiding the user through a session. The additional features of this voice system 103 are means for authentication (not shown) of the user before connecting to the message server 102, and adapting means 204 for adapting a voice command that has been converted to text into a text input that is applicable to a message server, such as the message server 102.

The message server 102 supports standard services for sending messages, such as e-mail and SMS messages, to mobile devices 104 or fixed devices 106. Various functions for these services can be effected by calling corresponding application software objects controlled by the first processing means 111 via the second interface means 110. These application software objects interact with the database 112 and effectuate the functions, such as e-mail and SMS functions. For example, there are application software objects for listing existing mail, reading mail, sending mail, deleting mail, sending SMS messages to mobile devices, managing simple address book look up and so on. Furthermore, it is possible for an originator to log on to the message server 102. This could be done directly or via the voice system 103. The same objects can be called via the voice system, providing the same functionality, as when connected directly to the message server 102.

For the originator to be able to call the application software objects controlled by the first processing means 111 in the message server 102 via the voice system 103, the voice system 103 supports a number of voice inputs corresponding to the application software objects. For example, if the user gives the voice input "get address", the voice recognition means 201 will recognize the voice input and the converting means 202 will convert the voice input to text. Then the adapting means 204 will adapt the text to a input that is applicable for calling the application software object for address lookup controlled by the message server 102 via the second interface means 110. Furthermore, the dialog server 203 in the voice system 103 guides the user through menus for executing the functions corresponding to the application software objects. For example, if the user gives the voice input "send message", the voice system 103 may answer with the question "to which recipient". The voice system 103 may also include a help function providing the user with help information. For a further description, see the description below with reference to FIG. 5.

Figure 3:
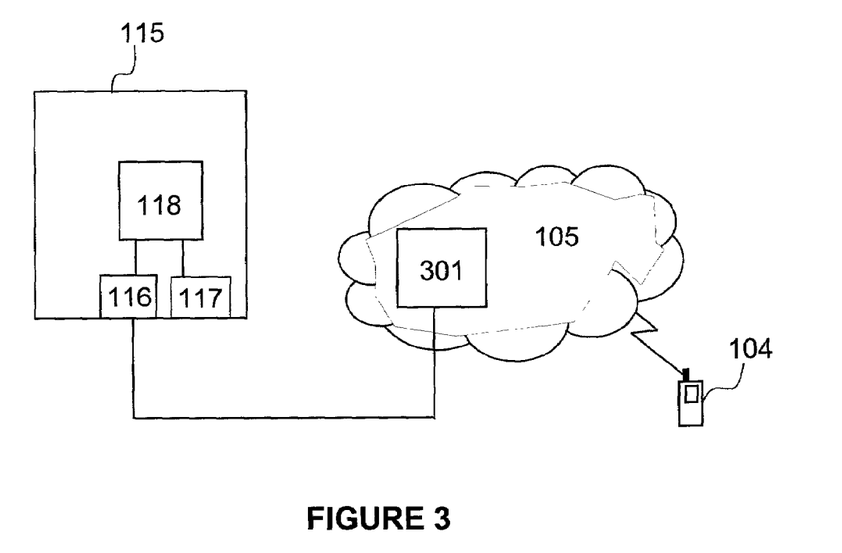
FIG. 3 is a more detailed diagram of another part of the system in FIG. 1.

In FIG. 3, a part of the system in FIG. 1 is shown. A presence server 115 is connected to a device 301 that in turn is connected to the mobile network 105 to which the recipient's mobile telephone 104 is connected.

In one embodiment illustrated by FIG. 3, the device 301 is an SMS-C. In order to get information from the mobile network regarding the availability of the recipient's mobile telephone 104, the presence server 115 sends an SMS message to the recipient's mobile telephone 104 and waits for an acknowledgement message from the SMS-C 301. If there is an acknowledgement from the SMS-C within a specified period of time, the presence server 115 determines that the recipient's mobile telephone is available. Otherwise the presence server 115 determines that the recipient's mobile telephone is not available.

In another embodiment also illustrated by FIG. 3, the device 301 is an HLR or a VLR. In this case the presence server 115 receives information from the HLR 301 (or the VLR). This information determines whether the recipient's mobile telephone 104 is attached to the mobile telephone network 105, or rather if the subscriber associated to the SIM card in the recipient's mobile telephone is attached to the mobile network 105. If this is the case the presence server 115 determines that the recipient's mobile telephone 104 is available Otherwise the presence server 115 determines that the recipient's mobile telephone 104 is not available.

In the embodiments in FIG. 1–3, the message server 102, the voice system 103 and the presence server 115 are depicted in block form indicating them to be separate physical devices. Of course, the embodiments could also be implemented in one single device in which the means 108–114, 116–118 are incorporated as software or hardware modules.

Figure 4:
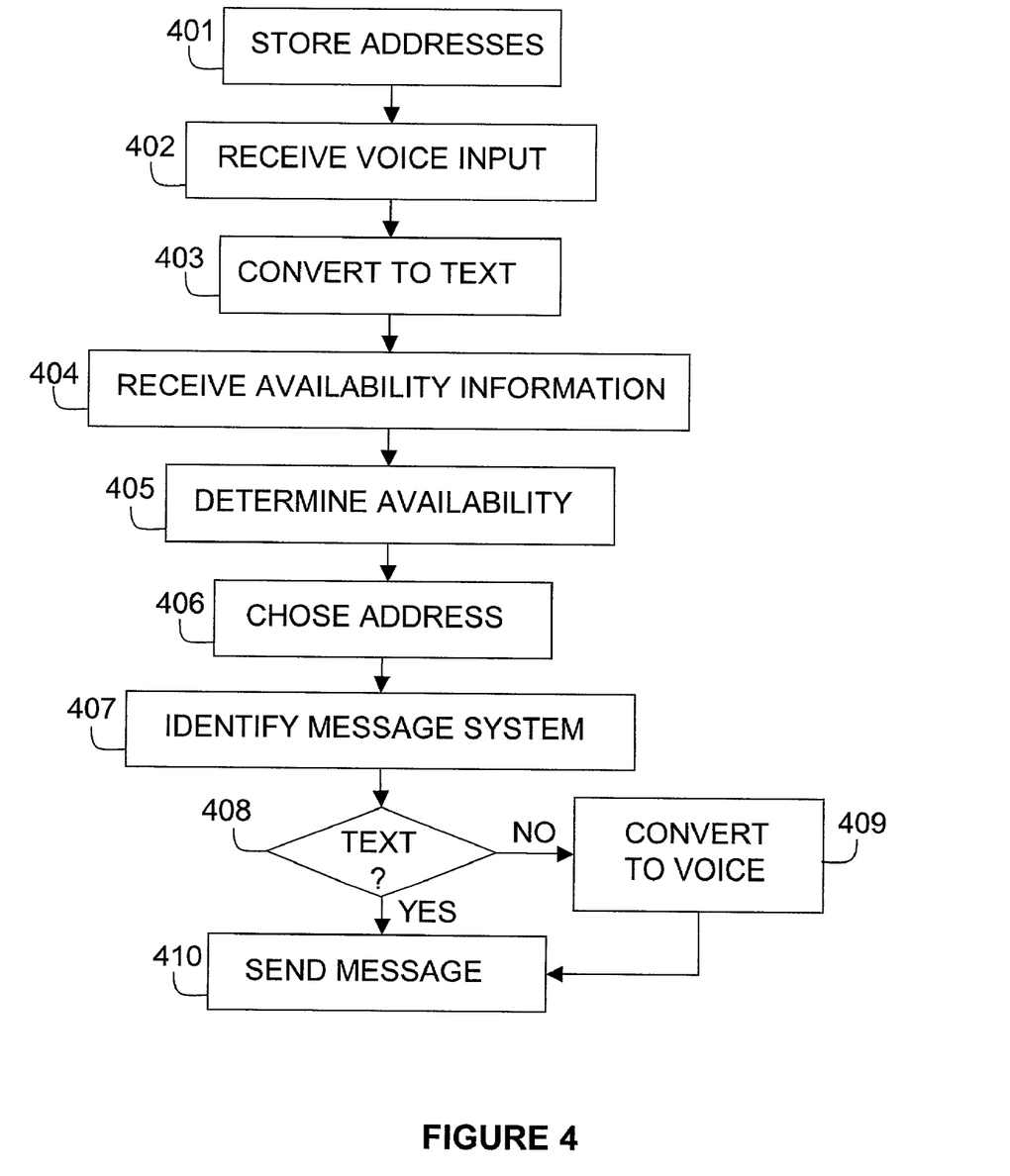
FIG. 4 is a flow chart of an embodiment of a method according to the invention.

Turning now to FIG. 4, a flow chart of an embodiment of a method according to the invention is shown. In step 401, one or more addresses of a recipient 104, 106, which addresses are associated to one or more message systems 105, 107, are stored in an address book. The address book could be a private address book of the originator or a central address book, which can be used by many different users. The addresses are linked to a recipient identification, which for example is used when the originator wants to look up the addresses of the recipient in the memory means 112. When an originator has connected to the message server 102 via the voice system 103 he or she can give a voice input including a recipient identification and a message. The voice system 103 then receives the voice input in step 402. The voice system 103 then converts this voice input into text in step 403 and relays it to the message server 102. In step 404 a presence server 115 receives availability information regarding the recipient from the message systems 105, 107, to which the message server 102 is connected. The availability information is interpreted in step 405 so as to determine in which of the message system 105, 107 the recipient is currently available. This information is then passed on to the message server 102. For a more detailed description on the availability information see the description below, with reference to FIGS. 6 and 7. The message server then chooses one of the addresses of the recipient in step 406 and identifies the message system 105, 107 associated with the chosen address in step 407. In step 408 the message server 102 determines whether the message system associated to the chosen address uses text messages or voice messages. If a voice message is to be used the text message included in the originator input is converted back to voice in step 409. Alternatively, a recording of the original voice message is to be used. If a text message is to be used no conversion is needed. Finally the message is sent to the recipient in step 410.

Figure 5:
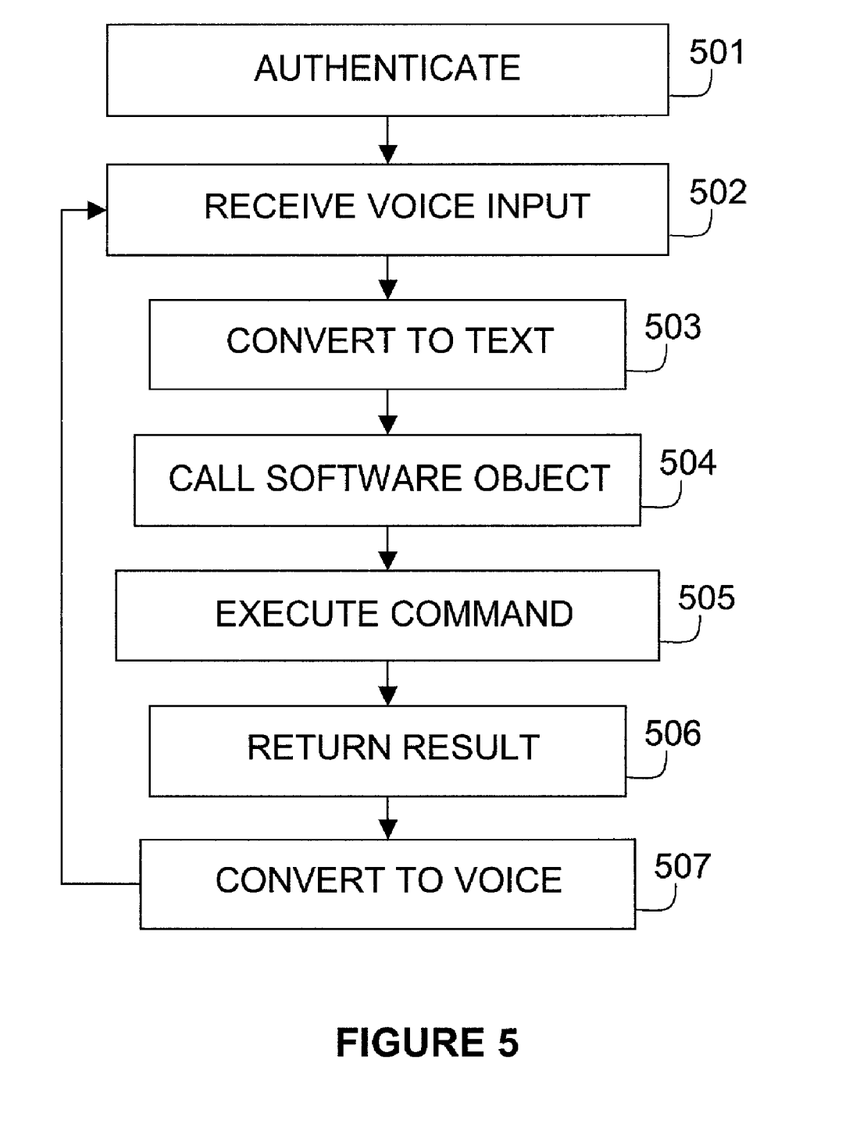
FIG. 5 is a flow chart of the processing performed by a voice system and a message server according to an embodiment of the invention.

In FIG. 5 the operation of a voice system 103 and a message server 102 in accordance with an embodiment of the invention is shown. When an originator has connected to the voice system 103 the originator is authenticated in step 501. The originator may now give a voice input in step 502, such as a recipient identification that he or she wants to send a message to. The voice system 103 will interpret the voice input and convert it to text in step 503. The voice system will then call the application software object corresponding to the function in message server 102 desired by the originator via the second interface means 110 in step 504. The message server 102 will then execute the desired function in step 505. When the command has been executed, the message server 102 will return the result to the voice system 103 in step 507.

For example, if the originator gives the voice input "send messages", the voice system 103 will recognize and interpret this, and ask to what recipient the message is to be sent. The originator will then state a recipient identification and the voice system 103 will convert it to text and call the application software object for address lookup in the message server 102 via the second interface means 110. The application software object for address lookup will execute an address look up in the memory means 112 based on the recipient identification stated by the originator. The result of the address lookup will be the addresses associated to the recipient identification. One of these addresses will then be chosen according to the method described with reference to FIG. 4 or according to some other way of choosing the address, such as choosing an address that has been defined to be a preferred address for communication. Alternatively, all of the addresses are chosen. The message server 102 will then return the address to the voice system 103 and the voice system 103 will convert it to voice and play it back to the originator. Now, the voice system 103 will ask the originator to state a message. The originator states the message and the voice system 103 converts the message to text and calls the appropriate application software object for sending a message via the first interface means 113, 114 in the message server 102. The message system to be used when sending the message is determined to be the message system 105, 107 associated with the chosen address. For example, if the address is an e-mail address the application software object for sending an e-mail will be used, and if the address is a mobile phone number the appropriate application software object for sending an SMS message will be used. The message will then be sent to the recipient via the first interface means 113, 114.

Figure 6:
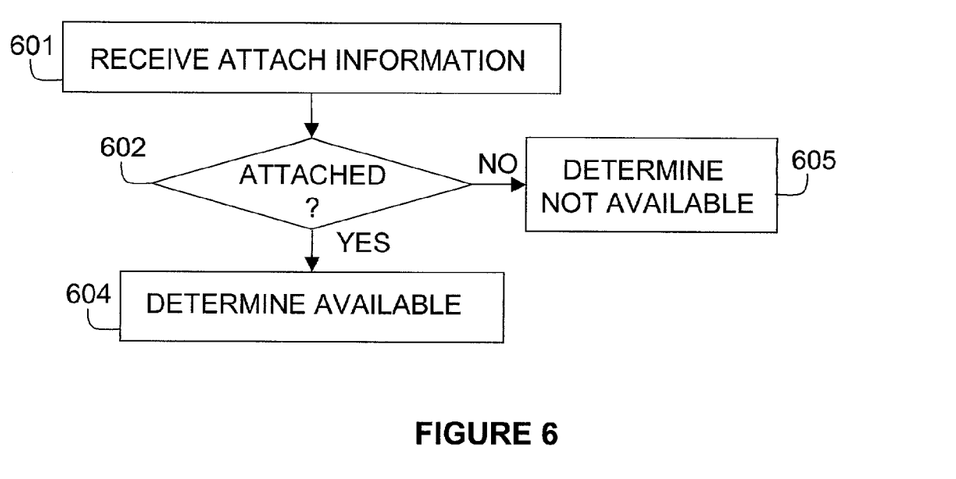
FIG. 6 is a flow chart with exemplifying operations for acquiring availability information in the embodiment referred to by FIG. 4.

Turning now to FIG. 6, a flow chart with exemplifying operations for acquiring availability information in the embodiment referred to by FIG. 4 is shown. These operations are suitable when a recipient is to be reached in a cellular mobile telephone system 105. In step 601, the availability information is received as information of whether the recipient, or rather the subscriber associated to the SIM card in the recipient's mobile telephone 104, is attached to the cellular mobile telephone system 105. This information is received from an HLR 301 in the cellular mobile telephone system 105. In step 602, it is then determined, based on information from the HLR, whether the recipient is attached or not. If the recipient is attached, the recipient is determined to be available in the cellular mobile telephone system 105. If not, the recipient is determined not to be available in the cellular mobile telephone system 105. In an alternative embodiment, the information of whether the recipient is attached or not is received from an VLR in the cellular mobile telephone system 105.

Figure 7:
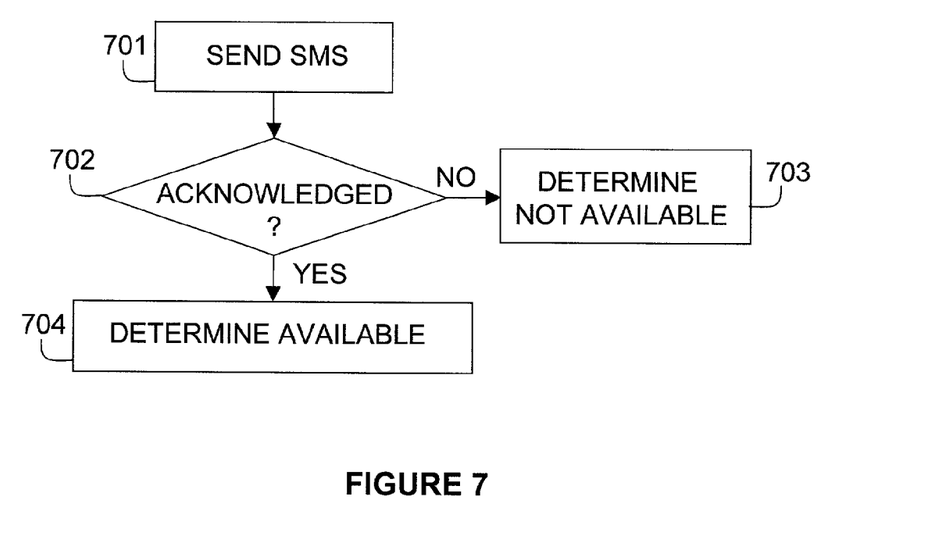
FIG. 7 is a flow chart with another set of exemplifying operations for acquiring availability information in the embodiment referred to by FIG. 4.

In FIG. 7 a flow chart with another set of exemplifying operations for acquiring availability information in the embodiment referred to by FIG. 4 is shown. This embodiment is also suitable when a recipient is to be reached in a cellular mobile telephone system 105. In step 701, an SMS message is sent from the presence server 115 to an SMS-C 301 in the cellular mobile telephone system 105. The SMS-C 301 will then send an acknowledgement back to the presence server 115 if the message could be delivered. In step 702, it is then determined whether or not an acknowledgement has been received from the SMS-C 301 to the presence server 115 within a specified time limit. If that is the case, the recipient is determined to be available in the cellular mobile telephone system 105. If not, the recipient is determined not to be available in the cellular mobile telephone system 105. The SMS message sent in step 701 can either be an SMS message sent from the presence server 115 for test purposes in order to determine the availability of the recipient, or it can be a previously sent message from an originator. In the latter case the presence server 115 will check the time of the latest reception of an acknowledgement of the delivery of a previously sent SMS message. If the time is within a predetermined time limit the presence server 115 will determine that the recipient is available. If not, the presence server will determine that the recipient is not available.

What is claimed is:

1. A method for enabling the sending of messages to a recipient via any of a number of messaging systems of different types, the method comprising:
   storing addresses for said recipient;
   receiving a recipient choice indicating at least one of the stored addresses as a preferred address for communication with said recipient;
   receiving recipient availability information from said messaging systems;
   interpreting said recipient availability information so as to determine in which of said messaging systems said recipient is currently available, wherein said recipient is considered to be available in at least said messaging system associated with said preferred address;
   receiving an originator input including an identification of said recipient, wherein said originator input further includes a message;
   identifying at least the messaging system associated with the preferred address;
   after identifying at least said messaging system, sending said message from a user device of said originator to said recipient via at least said messaging system associated with said preferred address; and
   receiving a recipient selection indicating a different at least one of the stored addresses as a new preferred address for communication with said recipient.

2. The method according to claim 1, further comprising:
   choosing a second address among said stored addresses, which second address is associated with a messaging system in which said recipient is currently available; and
   sending said message to said recipient via the messaging system associated with said second address.

3. The method according to claim 2, wherein one of said messaging systems is a cellular mobile system and said recipient availability information includes an indication of whether a mobile unit of said recipient is available or not.

4. The method according to claim 3, wherein said indication of whether said mobile unit of said recipient is available or not is an indication of whether said mobile unit of said recipient is attached to said cellular mobile system or not, further comprising:
   determining that said mobile unit of said recipient is available if said mobile unit of said recipient is attached to said cellular mobile system; and
   determining that said mobile unit of said recipient is not available otherwise.

5. The method according to claim 4, wherein said indication of whether said mobile unit of said recipient is attached to said cellular mobile system or not corresponds to a recipient attachment status in a Home Location Register in said cellular mobile system.

6. The method according to claim 4, wherein said indication of whether said mobile unit of said recipient is attached to said cellular mobile system or not corresponds to a attachment status in a Visitor Location Register in said cellular mobile system.

7. The method according to claim 2, further comprising:
   sending a Short Message Service message to said mobile unit of said recipient via a Short Message Service Center in said cellular mobile system;
   determining that said mobile unit of said recipient is available if an acknowledgement is received from the Short Message Service Center within a time limit; and
   determining that said mobile unit of said recipient is not available otherwise.

8. The method according to claim 2, further comprising:
   determining the type of message, text or voice, used in the messaging system associated with said second address; and
   sending said message as said determined type of message to said recipient via the messaging system associated with said second address.

9. The method according to claim 8, further comprising:
   receiving a reply message from said recipient as said determined type of message via the messaging system associated with said second address; and
   converting said reply message to voice if said reply message is a text message.

10. The method according to claim 2, wherein the messaging system associated with said second address is a cellular mobile system, said second address is a mobile phone number of a mobile unit of said recipient, and the message is sent as a Short Message Service message via said cellular mobile system.

11. The method according to claim 2, wherein the messaging system associated with said second address is an e-mail system, said second address is an e-mail address of said recipient, and the message is sent as an e-mail via said e-mail system.

12. The method according to claim 1, wherein said originator input is received as a voice input, further comprising converting said voice input to text.

13. A method as recited in claim 1, wherein said receiving a recipient selection of at least one of the stored addresses as a preferred address comprises receiving a selected address that is unique to a particular user device of said recipient.

14. A system for enabling the sending of messages to a recipient via any of a number of messaging systems of different types, comprising:
   first interface means connected to said messaging systems;

second interface means for receiving an originator input including an identification of said recipient, said originator input further including a message;
third interface means for receiving recipient availability information from said messaging systems;
memory means for storing addresses for said recipient, at least one address being selectively identified by said recipient as a preferred address for communication with said recipient;
first processing means for choosing at least said preferred address of the stored addresses, and for identifying at least the messaging system associated to the preferred address; and
second processing means for interpreting said recipient availability information so as to determine in which of said messaging systems said recipient is currently available, wherein said recipient is considered to be available in at least said messaging system associated with said preferred address;
wherein said first processing means are operatively connected to said second processing means, and said first interface means are arranged to send said message to said recipient via at least said messaging system associated with said preferred address, said message being sent from a user device of said originator after first processing means identifies at least said messaging system, and wherein the system is configured such that said recipient can initially choose at least one of the stored addresses to be the preferred address and can subsequently change the preferred address by choosing a different at least one of the stored addresses to be a new preferred address.

15. The system according to claim 14, wherein said first processing means are arranged to choose a second address among said addresses associated with said messaging systems in which said recipient is currently available and said first interface means are arranged to send said message to said recipient via the messaging system associated with said second address.

16. The system according to claim 15, wherein one of said messaging systems is a cellular mobile system and said third interface means are arranged to receive recipient availability information including an indication of whether a mobile unit of said recipient is available or not.

17. The system according to claim 16, wherein said third interface means are arranged to receive said indication of whether said mobile unit of said recipient is available or not as an indication of whether said mobile unit of said recipient is attached to said cellular mobile system or not, and said second processing means are arranged to determine that said mobile unit of said recipient is available if said mobile unit of said recipient is attached to said cellular mobile system and to determine that said mobile unit of said recipient is not available otherwise.

18. The system according to claim 17, wherein said third interface means are arranged to receive said indication of whether said mobile unit of said recipient is attached to said cellular mobile system or not from a Home Location Register in said cellular mobile system.

19. The system according to claim 17, wherein said third interface means are arranged to receive said indication of whether said mobile unit of said recipient is attached to said cellular mobile system or not from a Visitor Location Register in said cellular mobile system.

20. The system according to claim 15, wherein said third interface means are further arranged to send a Short Message Service message to said mobile unit of said recipient via a Short Message Service Center in said cellular mobile system, and said second processing means are arranged to determine that said mobile unit of said recipient is available if an acknowledgement is received from the Short Message Service Center within a time limit and to determine that said mobile unit of said recipient is not available otherwise.

21. The system according claim 15, wherein said second interface means are arranged to receive said originator input as a text message, further comprising:
fourth interface means for receiving said originator input as a voice input; and
converting means for converting said voice input to text, said converting means being connected to said second and said fourth interface means.

22. The system according to claim 21, wherein said first processing means are further arranged to determine the type of message, text or voice, used in the messaging system associated with said second address, and said first interface means are arranged to send said message as the determined type of message to said recipient via the messaging system associated with said second address.

23. The system according to claim 15, wherein the messaging system associated with said second address is a cellular mobile system, said second address is a mobile phone number of a mobile unit of said recipient, and said first interface means are further arranged to send said message as a Short Message Service message via said cellular mobile system.

24. The system according to claim 23, wherein said first interface means are further arranged to receive a reply message from said recipient via one of said messaging system, and said converting means are further arranged to convert said reply message to voice if said reply message is a text message.

25. The system according to claim 15, wherein the messaging system associated with said second address is an e-mail system, said second address is an e-mail address of said recipient, and said first interface means are further arranged to send the message as an e-mail via said e-mail system.

26. A computer readable medium having computer-executable instructions for performing the steps of:
storing addresses for a recipient;
receiving a recipient selection of at least one of the stored addresses as a preferred address for communication with said recipient;
receiving recipient availability information from said messaging systems; and
interpreting said recipient availability information so as to determine in which of said messaging systems said recipient is currently available, wherein said recipient is considered to be available in at least said messaging system associated with said preferred address;
receiving an originator input including an identification of said recipient, wherein said originator input further includes a message;
identifying at least the messaging system associated with the preferred address;
after identifying at least said messaging system, sending said message from a user device of said originator to said recipient via at least said messaging system associated with said preferred address; and
receiving a recipient selection of a different at least one of the stored addresses as a new preferred address for communication with said recipient.

27. The computer readable medium according to claim 26 having further computer-executable instructions for performing the steps of: choosing a second address among said stored addresses, which second address is associated with a messaging system in which said recipient is currently available; and sending said message to said recipient via the messaging system associated with the second address.

* * * * *